United States Patent [19]

Varadan

[11] 4,237,704
[45] Dec. 9, 1980

[54] OLDHAM TYPE COUPLING AND PUMP EMBODYING THE SAME

[75] Inventor: Rajan Varadan, Winterville, Ga.

[73] Assignee: Roper Industries, Inc., Commerce, Ga.

[21] Appl. No.: 18,510

[22] Filed: Mar. 8, 1979

[51] Int. Cl.³ .............................................. F16D 3/04
[52] U.S. Cl. ............................................ 64/31; 64/6; 64/23
[58] Field of Search ....................... 64/31, 17, 7, 6, 23, 64/10; 418/4 A, 61

[56] References Cited

U.S. PATENT DOCUMENTS

| | | | |
|---|---|---|---|
| 481,780 | 8/1892 | Brown | 64/31 |
| 1,178,529 | 4/1916 | Loomis | 64/31 |
| 1,380,330 | 5/1921 | Ziegler | 64/10 X |
| 1,411,468 | 4/1922 | Wood | 64/31 |
| 2,491,364 | 12/1949 | Earl | 64/17 |
| 2,545,604 | 3/1951 | Byram | 418/4 A |
| 3,539,279 | 11/1970 | Rider et al. | 418/4 A |
| 3,606,768 | 9/1971 | Wildhaber | 64/31 |
| 3,782,866 | 1/1974 | McDermott | 64/31 X |
| 4,036,031 | 7/1977 | Woodling | 64/7 |

*Primary Examiner*—Henry K. Artis
*Attorney, Agent, or Firm*—Morsbach & Pillote

[57] ABSTRACT

An Oldham type coupling including first and second end coupling members rotatable about relative parallel axes and an intermediate coupling member. The intermediate coupling member is connected to the first end coupling member for relative translatory movement along a first path radially of the first end coupling member by a first set of rollers that transmit torque and by a second set of rollers that transmit end thrust between the intermediate and first end coupling member. The intermediate coupling member is connected to the second end coupling member for relative translatory movement along a second path radially of the second end coupling member and crosswise of the first path by a third set of rollers that transmit torque and by a fourth set of rollers arranged to transmit end thrust between the intermediate and second end coupling members.

The application discloses the Oldham type coupling embodied in a progressive cavity type pump or motor in which one end coupling member is connected to the shaft and the other end coupling member is connected to the rotor having an eccentric motion with respect to the stator to drivingly interconnect the shaft and rotor and to transmit end thrust on the rotor through the coupling to the shaft.

19 Claims, 6 Drawing Figures

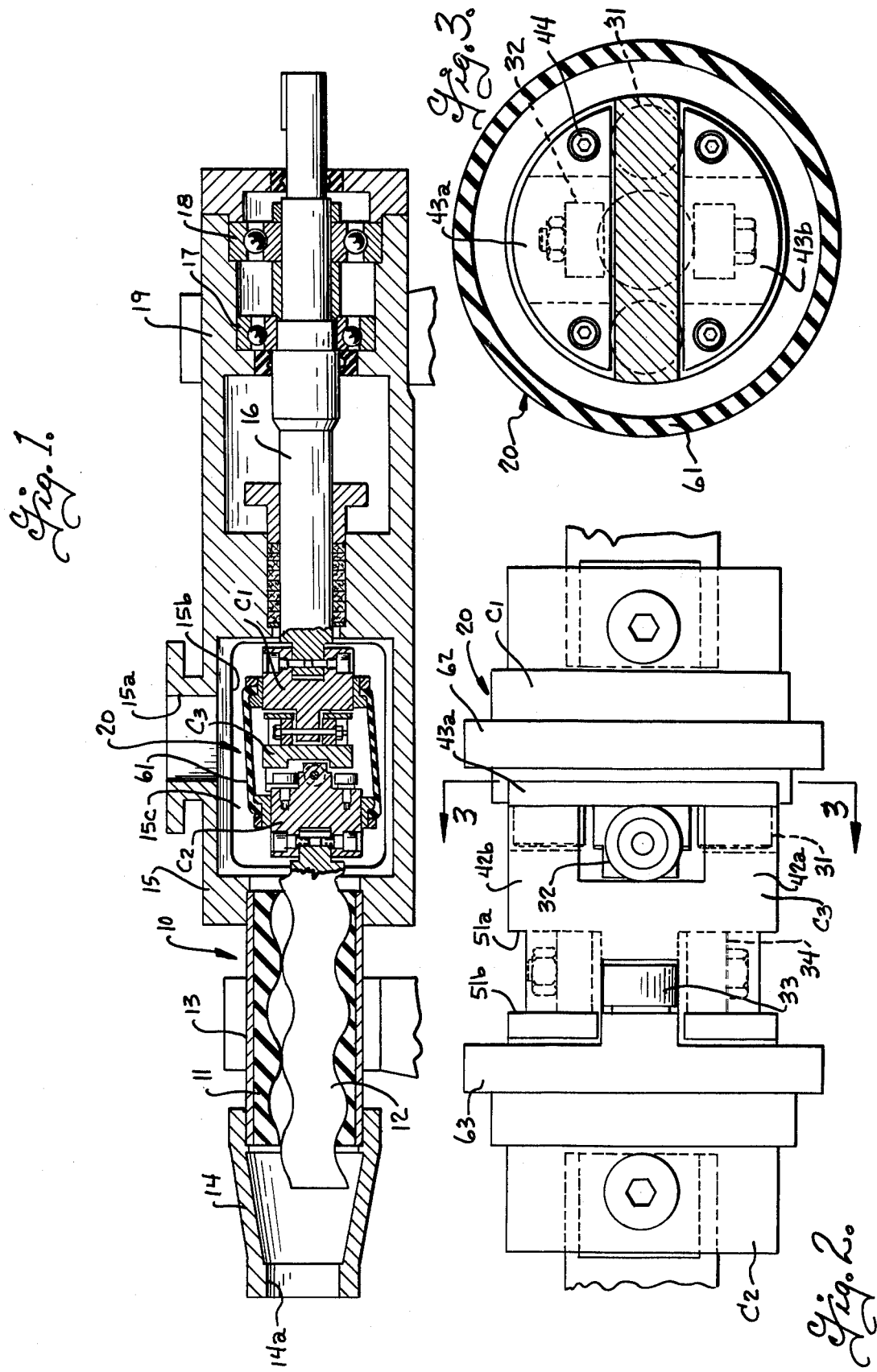

OLDHAM TYPE COUPLING AND PUMP EMBODYING THE SAME

BACKGROUND OF THE INVENTION

In the conventional Oldham type coupling, an intermediate coupling member is provided with relatively transverse keys that slidably engage keyways on the end coupling members to drivingly interconnect the end coupling members. The conventional Oldham type coupling, however, is not adapted for transmitting end thrust between the end coupling members, and, moreover, it is subject to relatively high sliding friction between the keys and keyways. Some coupling members such as shown in U.S. Pat. Nos. 481,780; 1,178,529; 1,411,468 and No. 2,491,364 utilize pins and sleeves for the keys and keyways of the Oldham type coupling and are capable of transmitting some end thrust through the coupling. However, the end thrust is transmitted through the same pins that also transmit the rotary torque between the coupling members and, further, the pin and sleeve type connection is still objectionable because of the relatively high sliding friction. It has also been proposed, for example as shown in U.S. Pat. No. 1,380,330 and No. 3,606,768, to provide rollers in an Oldham type coupling rotatable about an axes paralleling the coupling axes to transmit torque between the coupling members. However, such couplings were not adapted for transmitting end thrust through the coupling members.

In progressive cavity type pumps, the rotor has an eccentric motion relative to the stator and to the drive shaft and, moreover, is subjected to end thrust due to the difference in fluid pressure at the inlet and outlet ends of the rotor. In order to drivingly interconnect the shaft and rotor and to transmit end thrust therebetween, it is common practice to utilize a cardan shaft which is connected by a first universal joint at one end to the drive shaft and by a second universal joint at its other end to the rotor. The intermediate cardan shaft should be relatively long to minimize the angle to which the shaft oscillates during each revolution and the cardan type coupling thus occupies a substantial space and is, moreover, difficult to seal from the fluid being pumped.

It has been proposed as shown in U.S. Pat. No. 2,545,604 to utilize an Oldham type coupling to interconnect the rotor and shaft in a progressive cavity type pump. However, the Oldham type coupling utilized in the above patent was not capable of transmitting end thrust between the coupling members and the patent discloses an arrangement at one end of the rotor for transmitting end thrust in one direction directed to the housing and different arrangements at the other end of the rotor for transmitting end thrust on the rotor in the other direction either to the housing or directly to the input shaft.

SUMMARY OF THE INVENTION

An important object of the present invention is to provide an improved Oldham type coupling in which both torque loads and end loads are transmitted through the coupling by rollers to eliminate sliding friction between the relatively movable members of the coupling.

Accordingly, the present invention provides an Oldham type coupling including first and second end coupling members and an intermediate coupling member with a first connecting means connecting the intermediate coupling member to the first end coupling member for translatory movement along a first path radially of the first end coupling member and a second connecting means connecting the intermediate coupling member to the second end coupling member for translatory movement along the second path radially of the second end coupling member and crosswise of the first path, wherein the first connecting means including a first roller means rotatable about an axis parallel to the axis of the coupling members for transmitting torque between the intermediate and first end coupling members and a second roller means rotatable about an axis perpendicular to said first path and in a plane perpendicular to the axes of the coupling members for transmitting end thrust between the intermediate and first end coupling members, the second connecting means including a third roller means rotatable about an axis parallel to the axes of the coupling members for transmitting torque between the intermediate and second end coupling members and a fourth roller means rotatable about an axis perpendicular to the second path and in a plane perpendicular to the axes of the coupling members for transmitting end thrust between the intermediate and second end coupling members.

The present invention also provides a progressive cavity pump or motor utilizing the foregoing Oldham type coupling to drivingly interconnect the rotor and shaft and for transmitting end thrust on the rotor through the coupling member to the shaft.

These, together with other objects, features and advantages of this invention will be more readily understood by reference to the following detailed description, when taken in connection with the accompanying drawings wherein:

FIG. 1 is a longitudinal sectional view through a progressive cavity pump embodying the improved Oldham type coupling of the present invention;

FIG. 2 is a top plan view of the coupling shown in FIG. 1 with the protective sleeve removed;

FIG. 3 is a transverse sectional view taken on the plane 3—3 of FIG. 1;

Figure 4:
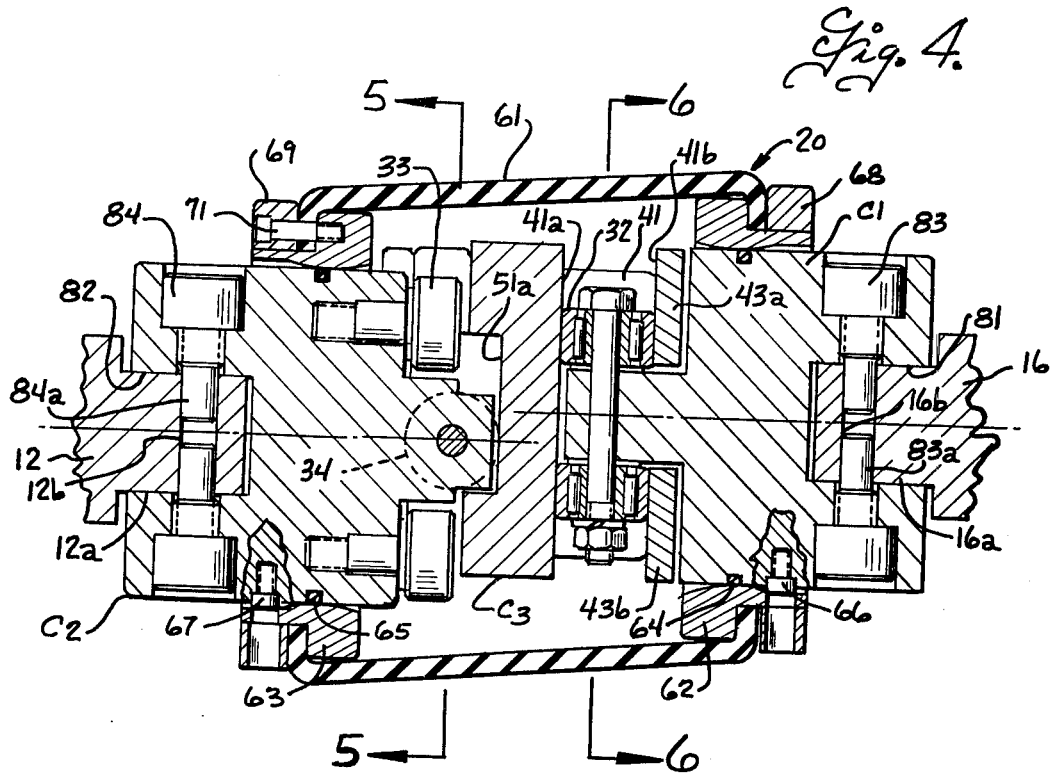
FIG. 4 is a longitudinal sectional view taken on the plane 4—4 of FIG. 2.

Reference is now made more specifically to FIG. 1 of the drawing illustrating a progressive cavity pump or motor embodying the improved Oldham type coupling for connecting the rotor to the pump shaft. In general, the progressive cavity pump or motor 10 includes an internally helically threaded stator 11 and an externally threaded rotor 12, the stator having one more thread than the rotor. The stator is conventionally formed of a resilient material such as rubber and the rotor formed of a rigid material such as metal. The stator is enclosed in a rigid shell 13 and fittings 14 and 15 are provided at opposite ends of the shell and have passages 14a and 15a adapted for connection to the external piping system. The rotor can be driven in either direction to pump fluid from the passage 14a to the passage 15a or vice versa. A shaft 16 is rotatably supported as by combination radial and thrust bearings 17, 18 on a bearing housing 19 that is rigidly connected to the fitting 15. Shaft 16 is mounted for rotation about the axis of the stator 11 while the rotor 12 has an eccentric motion with respect to the stator and shaft and rotates in an orbital path relative to the stator. The coupling 20 of the present invention is provided for connecting the shaft 16 to the stator 12 to drivingly interconnect the same and to transmit end thrust on the rotor through the coupling to the shaft.

The coupling 20 includes first and second end coupling members $C_1$ and $C_2$ adapted for connection to the shaft and rotor, and an intermediate coupling member $C_3$. The intermediate coupling $C_3$ is connected to the first end coupling member $C_1$ for translatory movement along a first path $P_1$ (FIG. 6) radially of the first coupling member and the intermediate coupling member is connected to the second end coupling member $C_2$ for translatory movement along a second path $P_2$ (FIG. 5) radially of the second end coupling member. A first set of rollers 31 are mounted for rotation about axes paralleling the axis of the first end coupling member for transmitting torque between the first end coupling member and the intermediate coupling member and a second set of rollers 32 are mounted for rotation perpendicular to the first path $P_1$ and in a plane perpendicular to the axis of the first end coupling member to transmit end thrust between the intermediate and first end coupling members. Similarly, a third set of rollers 33 are mounted for rotation about axes paralleling the axis of the second end coupling member $C_2$ to transmit torque between the intermediate coupling member and the second end coupling member and a fourth set of rollers 34 are mounted for rotation about an axis perpendicular to the second path and in a plane perpendicular to the axis of the second end coupling member for transmitting end thrust between the intermediate and second end coupling members. Thus, the first and second sets of rollers interconnect the intermediate coupling member and the first end coupling member and the third and fourth sets of rollers interconnect the intermediate coupling member and the second end coupling member. The rollers can be mounted on either of the interconnected pairs of coupling members. However, the first and second sets of rollers are preferably mounted on the same coupling member and the third and fourth sets of rollers are also preferably mounted on the same coupling member. In the preferred embodiment shown, the first and second sets of rollers are mounted on the first end coupling members $C_1$ and the third and fourth sets of rollers are mounted on the second end coupling member $C_2$ and engage guideways formed on the intermediate coupling member $C_3$.

Rollers 31–34 are preferably of the anti-friction type including inner and outer races with anti-friction rollers or balls therebetween. The first set of rollers 31 comprise a pair of rollers mounted by stub axles 35 on the coupling members $C_1$ for rotation about axes paralleling the longitudinal axis of the coupling members $C_1$ and radially offset from relatively opposite sides of the axis of the couplings $C_1$. The intermediate coupling member has a first guideway 36 formed therein, conveniently by milling a slot diametrically across one end face of the intermediate coupling member, and which first guideway has relatively parallel wall portions 36a and 36b disposed parallel to and spaced equal distance from a longitudinal plane through the diameter of the intermediate coupling member. Wall portions 36a and 36b are spaced apart a distance slightly greater, for example of the order of 0.002 to 0.004 inches greater than the diameter of the rollers 31 to allow the rollers to roll freely in the guideway 36 when in engagement with one of the wall portions. Thus, rollers 31 and the wall portions 36a, 36b of the guideway 36 guide the intermediate coupling members for translatory movement along a first path $P_1$ perpendicular to the axis of the first coupling member $C_1$ and the rollers engaging the wall portions 36a and 36b transmit torque and rotational motion between the first coupling members $C_1$ and the intermediate coupling members $C_3$.

Figure 6:
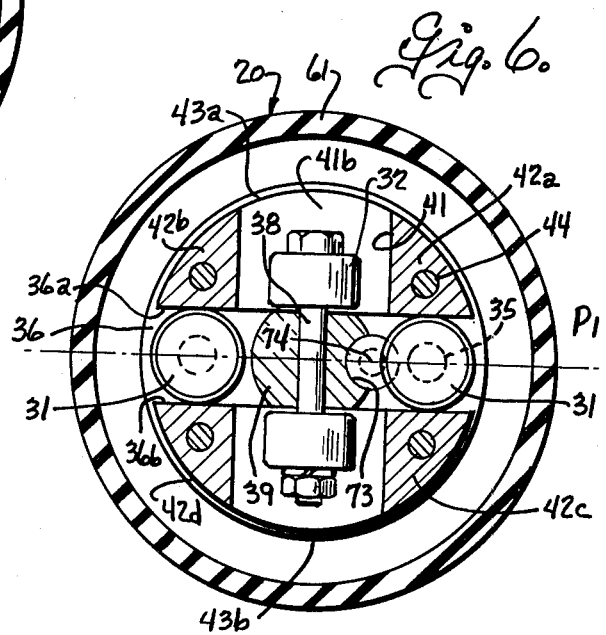
FIG. 6 is a transverse sectional view taken on the plane 6—6 of FIG. 4.

The second set of rollers 32 comprise a pair of rollers mounted for rotation about an axis perpendicular to the path $P_1$ and a plane perpendicular to the axis of the first coupling member to allow relative translatory movement therebetween along path $P_1$. As best shown in FIGS. 4 and 6, the rollers 32 are mounted on a cross shaft 38 that extends through a central boss 39 on the coupling member $C_1$. Rollers 32 are spaced equi-distant from the axis of the end coupling member $C_1$ and the intermediate coupling member is formed with a second guideway 41 having relatively parallel wall portions 41a and 41b disposed in planes perpendicular to the path $P_1$ and perpendicular to the axis of the intermediate coupling member $C_3$, and the wall portions 41a and 41b are spaced apart in a direction axially of the intermediate coupling member a distance only slightly greater, for example of the order of 0.002 to 0.004 inches greater than the diameter of the rollers 32, to transmit end thrust between the first end coupling members and the intermediate coupling member. The second guideway 41 is conveniently formed by providing a slot that extends diametrically of the intermediate coupling member and perpendicular to the path $P_1$, with the guideway having a width as shown in FIG. 6 sufficiently greater than the diameter of the rollers 32 to accommodate the maximum desired translatory movement of the intermediate coupling member relative to the first end coupling member $C_1$ along path $P_1$ as best shown in FIG. 6. Intersecting guideways 36 and 41 define four corner posts 42a–42d. One of the wall portions 41a of guideway 41 is formed on the end face of the intermediate coupling member $C_3$ and the other wall portions 41b are formed on thrust plates 43a and 43b which are secured as by fasteners 44 to the corner posts 42a, 42b and 42c, 42d respectively to extend in spaced relation to the wall portion 41a. Rollers 32 engaging wall portions 41a and 41b thus operate to transmit end thrust in both directions between the intermediate and end coupling members $C_1$ while accommodating relative translatory movement therebetween along path $P_1$.

Figure 5:
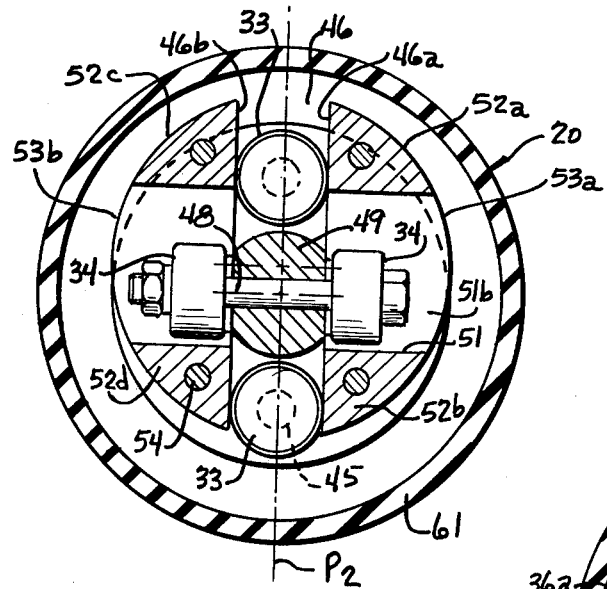
FIG. 5 is a transverse sectional view taken on the plane 5—5 of FIG. 4.

The third set of rollers 33 comprise a pair of rollers mounted by stub axles 45 on the second end coupling member $C_2$ for rotation about an axes parallel to the longitudinal axis of the second end coupling member and spaced from relatively opposite sides of the axis. The intermediate coupling member has a third guideway 46 formed therein and which provides relatively parallel wall portions 46a and 46b that are disposed parallel to and spaced equi-distant from a longitudinal plane through the diameter of the intermediate coupling member to guide the intermediate coupling member for translatory movement relative to the second end coupling member along the second path $P_2$ perpendicular to the path $P_1$. Wall portions 46a and 46b are spaced apart a distance only slightly greater than the diameter of the rollers 33 to allow free rolling movement therealong and rollers 33 engaging the wall portions 46a and 46b transmit torque and rotary motion between the intermediate coupling member and the second end coupling member, while accommodating relative translatory movement therebetween along the path $P_2$. The fourth set of rollers 34 comprise a pair of rollers having aligned axes and spaced radially from relatively opposite sides of the axis of the second coupling member. Rollers 34 are mounted on a cross-shaft 48 that extends through a central boss 49 on a second end coupling member $C_2$ and the rollers 34 are rotatable about an axis perpendicular to the path $P_2$ and in a plane perpendicular to the axis of the second end coupling member. A fourth guideway 51 is formed in the intermediate coupling member $C_3$ and has relatively parallel wall portions 51a and 51b disposed in planes perpendicular to the axis of the intermediate coupling members. As shown in FIG. 5, guideway 51 is conveniently formed by providing a slot in the intermediate coupling member that extends crosswise of the guideway 46 and forms four corner posts 52a and 52d. One of the wall portions 51a of the guideway 51 is formed on the intermediate coupling member at the base of the slot and the other wall portions 51b are provided on thrust plates 53a and 53b that are attached to the corner posts 52a, 52b and 53a, 53b respectively as by fasteners 54. The width of the guideway 51 is made sufficiently greater than the diameter of the rollers 34 to accommodate the maximum translatory movement of the intermediate coupling member relative to the second end coupling member along path $P_2$ and the space between the wall portions 51a and 51b of the guideway 51 is made only slightly greater than the diameter of the rollers, for example in the order of 0.002 to 0.004 inches, to allow free rolling movement of the rollers during relative translatory movement along the path $P_2$. Rollers 34 engaging the wall portions 51a and 51b transmit end thrust in both directions between the intermediate coupling member and the second end coupling members $C_2$.

Provision is advantageously made for sealing the coupling 20 to not only protect the coupling against entrance of foreign material from the surrounding medium, but to also retain a quantity of lubricating oil around the coupling. As best shown in FIGS. 1 and 4, a resilient sleeve 61 surrounds the coupling and is secured to the end coupling members $C_1$ and $C_2$. In the embodiment illustrated, the sleeve is of a resilient elastomeric material such as rubber, it being understood that the sleeve could also be formed in a bellows like configuration and may, if desired, be formed of a thin, flexible metal. The sleeve is secured to the end coupling members $C_1$ and $C_2$ by rings 62 and 63 that extend around the end coupling members $C_1$ and $C_2$ respectively and the rings are sealed to the end coupling members as by O-rings 64, 65. The rings 62 and 63 are non-slidably and non-rotatably anchored to the respective end coupling member by screws 66 and 67. The ends of the sleeve 61 are clamped to the rings 62 and 63 by clamp rings 68 and 69 and attaching screws 71. The sleeve 61 surrounds the coupling to protect the coupling from foreign material and lubricating oil can be introduced into the space internally of the sleeve through a filler opening 73 in one of the end coupling members $C_1$ (See FIG. 6) and a means such as a plug 74 is provided for closing the filler opening.

Various different arrangements can be provided for non-slidably and non-rotatably connecting the end coupling members $C_1$ and $C_2$ to the shaft and rotor. However, in order to facilitate repair and replacement of the coupling 20 without requiring disassembly of the pump or disconnection of the pump from the pumping system, the connections of the coupling to the shaft and rotor are advantageously arranged so as to enable the coupling to be moved laterally into and out of position between the rotor and shaft. For this purpose, the end coupling members $C_1$ and $C_2$ are respectively provided with cross slots 81 and 82 which extend diametrically of the respective coupling members at the outer faces thereof. As best shown in FIG. 4, the slots 81 and 82 are parallel to each other when the coupling is assembled and the rotor and shafts 12 and 16 are provided with flattened ends 12a and 16a that are non-rotatably receivable in the slots 81 and 82. Threaded pins 83 and 84 are threaded into the end coupling members $C_1$ and $C_2$ respectively and have reduced ends 83a and 84a that extend into openings 16b and 12b in the flattened ends of the shaft and rotor. As will be seen, the flats on the ends of the shaft and rotor provide tenons that extend into the slots 81 and 82 to transmit rotary motion therebetween and the pins 83 and 84 connect the shaft and rotor to respective coupling member to transmit axial thrust therebetween. The coupling 20 can be easily removed and installed between the shaft and rotor by first removing the pins 83, 84 and then sliding the coupling crosswise of the shaft and rotor. The fitting 15 is provided with an access opening 15b (FIG. 1) closed by a removable cover 15c sufficiently large to allow movement of the coupling member laterally into and out of the fitting.

From the foregoing it is thought that the construction and operation of the coupling and the progressive cavity pump embodying the same, will be readily understood. The first and third sets of rollers 31 and 33 engage the first and third guideways 36 and 46 in the intermediate coupling member to connect the intermediate coupling member to the end coupling member $C_1$ and $C_2$ for translatory movement along relatively perpendicular paths $P_1$ and $P_2$ and to transmit torque and rotary motion between the coupling members. The second and fourth sets of rollers 32 and 34 are mounted for rotation about an axes that are respectively perpendicular to paths $P_1$ and $P_2$ and engage guideways 41 and 51 in the intermediate coupling member. Rollers 32 and 34 are arranged to roll in their respective guideways 41 and 51 to accommodate translatory movement along the paths $P_1$ and $P_2$ respectively and the rollers engage guide surfaces disposed perpendicular to the axes of the respective coupling member to transmit end thrust between the intermediate and the end coupling members. The coupling is non-slidably and non-rotatably connected to the roller and shaft so that end thrust on the rotor is transmitted through the coupling 20 to the shaft and the combination radial and thrust bearings 17 and 18 that support the shaft take up the end thrust on the rotor. The slot and tenon arrangement for connecting the coupling to the shaft and rotor enables the coupling to be installed and removed laterally from between the shaft and rotor after the pins 83 and 84 are removed. This allows the coupling to be serviced and repaired without disassemblying the pump or disconnecting the pump from the pumping system.

The coupling 20 is short as compared to the cardan shaft and universal arrangement commonly used for connecting the shaft and rotary progressive cavity pumps. Further, the coupling is sealed by the sleeve 61 from the surrounding medium and the sleeve also functions to maintain a quantity of lubricant in contact with the moving parts of the coupling to reduce friction and minimize wear.

The embodiments of the invention in which an exclusive property or privilege is claimed are defined as follows:

1. In an Oldham type coupling including first and second end coupling members having relatively parallel axes and an intermediate coupling member between the first and second end coupling members, a first connecting means connecting the intermediate coupling member to the first end coupling member for translatory movement along a first path radially of the first end coupling member, a second connecting means connecting the intermediate coupling member to the second end coupling member for translatory movement along a second path radially of the second end coupling member and crosswise of the first path, the improvement comprising, said first connecting means including first roller means rotatable about an axis parallel to the axes of the coupling members for transmitting torque between the intermediate and first end coupling members and a second roller means rotatable about an axis perpendicular to said first path and in a plane perpendicular to the axes of the coupling members for transmitting end thrust between the intermediate and first end coupling members, said second connecting means including a third roller means rotatable about an axis parallel to the axes of the coupling members for transmitting torque between the intermediate and second end coupling members and a fourth roller means rotatable about an axis perpendicular to said second path and in a plane perpendicular to the axes of the coupling members for transmitting end thrust between the intermediate and second end coupling members.

2. An Oldham type coupling according to claim 1 wherein said first and second roller means are mounted on the same coupling member and said third and fourth roller means are mounted on the same coupling member.

3. An Oldham type coupling according to claim 1 wherein said first and second roller means are mounted on said first end coupling member and said third and fourth roller means are mounted on said second end coupling member.

4. An Oldham type coupling according to claim 1 wherein said first roller means comprises a first pair of rollers having relatively parallel axes and spaced from the axes of the first end coupling member at relatively opposite sides thereof, said second roller means comprises a second pair of rollers having aligned axes and spaced from the axis of the first end coupling member at relatively opposite sides thereof, said third roller means comprises a third pair of rollers having relatively parallel axes spaced from the axis of the second end coupling member at relatively opposite sides thereof, said fourth roller comprises a fourth pair of rollers having aligned axes and spaced from the axis of the second end coupling member at relatively opposite sides thereof.

5. An Oldham type coupling according to claim 1 wherein said first connecting means includes a first guideway having relatively parallel wall portions disposed in planes paralleling the axes of the coupling members for engaging the first roller means and a second guideway having relatively parallel wall portions disposed in planes perpendicular to the axes of the coupling members for engaging the second roller means, said second connecting means including a third guideway having relatively parallel wall portions disposed in planes paralleling the axes of the coupling members for engaging the third roller means, and a fourth guideway having relatively parallel wall portions disposed in planes perpendicular to the axes of the coupling members for engaging the fourth roller means.

6. An Oldham type coupling according to claim 5 wherein said first roller means comprises a first pair of rollers having relatively parallel axes and spaced from the axes of the first end coupling member at relatively opposite sides thereof, said second roller means comprises a second pair of rollers having aligned axes and spaced from the axis of the first end coupling member at relatively opposite sides thereof, said third roller means comprises a third pair of rollers having relatively parallel axes spaced from the axis of the second end coupling member at relatively opposite sides thereof, said fourth roller means comprises a fourth pair of rollers having aligned axes and spaced from the axis of the second end coupling member at relatively opposite sides thereof.

7. An Oldham type coupling according to claim 5 wherein said first and second roller means are mounted on said first end coupling members, said third and fourth roller means are mounted on said second end coupling member, and said guideways are on said intermediate coupling member.

8. An Oldham coupling according to claim 1 including a flexible sleeve surrounding said Oldham type coupling and secured to the first and second end coupling members in sealed relation thereto.

9. An Oldham type coupling according to claim 1 wherein said first and second end coupling members each have a diametric slot in the outer face thereof, first and second shafts having tenons on the ends thereof non-rotatably receivable in the diametric slots in the first and second end coupling members respectively and pin means on the first and second end coupling members for securing the shafts to the end coupling members.

10. In a progressive cavity pump or motor including a stator having a pump axis, a shaft aligned with the pump axis and spaced axially from the stator, a rotor in the stator having an eccentric motion with respect to the stator and shaft, an Oldham type coupling including a shaft coupling member connected to the shaft, a rotor coupling member connected to the rotor, an intermediate coupling member intermediate the shaft and rotor coupling members, a first connecting means connecting the intermediate coupling member to the shaft coupling member for translatory movement along a first path radially of the shaft coupling member, a second connecting means connecting the intermediate coupling member to the rotor coupling member for translatory movement along a second path radially of the rotor coupling member and at an angle to said first path, the improvement comprising, said first connecting means including a first roller means rotatable about an axis parallel to the pump axis for transmitting torque between the intermediate and shaft coupling members and a second roller means rotatable about an axis perpendicular to said first path and in a plane perpendicular to the pump axis for transmitting end thrust between the intermediate and shaft coupling members, said second connecting means including a third roller means rotatable about an axis parallel to the pump axis for transmitting torque between the intermediate and rotor coupling members and a fourth roller means rotatable about an axis perpendicular to said second path and in a plane perpendicular to the pump axis for transmitting end thrust between the intermediate and rotor coupling members.

11. A progressive cavity pump or motor according to claim 10 wherein said first and third roller means each comprise a pair of rollers having relatively parallel axes and spaced from the pump axis at relatively opposite sides thereof and said second and fourth roller means each comprise a pair of rollers having aligned axes and spaced from the pump axis at relatively opposite sides thereof.

12. A progressive cavity pump or motor according to claim 10 wherein said first and second roller means are mounted on the same coupling member and said third and fourth roller means are mounted on the same coupling member.

13. A progressive cavity pump or motor according to claim 10 wherein said first and second roller means are mounted on said shaft coupling member and said third and fourth roller means are mounted on said rotor coupling member.

14. A progressive cavity pump or motor according to claim 10 including a flexible sleeve surrounding said Oldham type coupling, and means securing the ends of the sleeve to the shaft coupling member and rotor coupling member in sealed relation thereto.

15. A progressive cavity pump according to claim 10 wherein said first connecting means includes a first guideway having relatively parallel wall portions disposed in planes paralleling the pump axis for engaging the first roller means and a second guideway having relatively parallel wall portions disposed in planes perpendicular to the pump axis for engaging the second roller means, said second connecting means including a third guideway having relatively parallel wall portions disposed in planes paralleling the pump axis for engaging the third roller means and a fourth guideway having relatively parallel wall portions disposed in planes perpendicular to the pump axis for engaging the fourth roller means.

16. A progressive cavity pump according to claim 15 wherein said first and second roller means are mounted on said first end coupling members, said third and fourth roller means are mounted on said second end coupling member, and said guideways are on said intermediate coupling member.

17. A progressive cavity pump according to claim 10 wherein said first and third roller means each comprise a pair of rollers having relatively parallel axes and spaced from the pump axis at relatively opposite sides thereof, said second and fourth roller means each comprise a pair of rollers having aligned axes and spaced from the pump axis at relatively opposite sides thereof, said first connecting means including a first guideway having relatively parallel wall portions disposed in planes paralleling the pump axis for engaging the first pair of rollers and a second guideway having relatigely parallel wall portions disposed in planes perpendicular to the pump axis for engaging the second pair of rollers, said second connecting means including a third guideway having relatively parallel wall portions disposed in planes paralleling the pump axis for engaging the third pair of rollers and a fourth guideway having relatively parallel wall portions disposed in planes perpendicular to the pump axis for engaging the fourth pair of rollers.

18. A progressive cavity pump according to claim 10 wherein one of the items comprising the rotor and rotor coupling member has a diametrically extending slot and the other has a tenon non-rotatably received in the slot and pin means extending transverse to the slot to axially connect the rotor and rotor coupling member, one of the items comprising the shaft and shaft coupling member has a diametrically extending slot and the other has a tenon non-rotatably received in the slot, and pin means extending transverse to the slot to axially connect the shaft and shaft coupling member.

19. A progressive cavity pump according to claim 18 wherein the slot and tenon on the rotor and rotor coupling member are parallel to the slot and tenon on the shaft and shaft coupling member.

* * * * *